(12) United States Patent
Chen et al.

(10) Patent No.: US 8,060,505 B2
(45) Date of Patent: Nov. 15, 2011

(54) METHODOLOGIES AND ANALYTICS TOOLS FOR IDENTIFYING WHITE SPACE OPPORTUNITIES IN A GIVEN INDUSTRY

(75) Inventors: Ying Chen, San Jose, CA (US); Jeffrey Thomas Kreulen, San Jose, CA (US); James J. Rhodes, Los Gatos, CA (US); William Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 11/674,598

(22) Filed: Feb. 13, 2007

(65) Prior Publication Data

US 2008/0195568 A1    Aug. 14, 2008

(51) Int. Cl.
*G06F 7/00* (2006.01)
*G06F 17/30* (2006.01)
(52) U.S. Cl. .................. 707/729; 707/730; 707/923
(58) Field of Classification Search .................. None
See application file for complete search history.

(56) References Cited

U.S. PATENT DOCUMENTS

| | | | |
|---|---|---|---|
| 5,982,506 A * | 11/1999 | Kara | 358/405 |
| 6,424,971 B1 | 7/2002 | Kreulen et al. | |
| 6,523,026 B1 * | 2/2003 | Gillis | 1/1 |
| 6,826,724 B1 * | 11/2004 | Shimada et al. | 715/234 |
| 6,968,332 B1 * | 11/2005 | Milic-Frayling et al. | 707/3 |
| 2002/0035499 A1 | 3/2002 | Germeraad et al. | |
| 2002/0138465 A1 * | 9/2002 | Lee | 707/1 |
| 2003/0200198 A1 * | 10/2003 | Chandrasekar et al. | 707/1 |
| 2004/0064438 A1 | 4/2004 | Kostoff | |
| 2005/0071367 A1 | 3/2005 | He et al. | |
| 2005/0131931 A1 * | 6/2005 | Kawajiri | 707/101 |
| 2005/0165736 A1 | 7/2005 | Oosta | |
| 2005/0177555 A1 | 8/2005 | Alpert et al. | |
| 2005/0210008 A1 * | 9/2005 | Tran et al. | 707/3 |
| 2005/0246332 A1 * | 11/2005 | Wang et al. | 707/3 |
| 2006/0080135 A1 * | 4/2006 | Frank et al. | 705/1 |

(Continued)

FOREIGN PATENT DOCUMENTS

JP    2006155626 A  *  6/2006

OTHER PUBLICATIONS

Amy Trappey;"Development of a Patent Document classificiation and search platform using a back-propagation network" 2006; Elsevier; pp. 755-761.*

(Continued)

*Primary Examiner* — Neveen Abel-Jalil
*Assistant Examiner* — Jermaine Mincey
(74) *Attorney, Agent, or Firm* — Shimokaji & Associates, P.C.

(57) ABSTRACT

A method for analyzing predefined subject matter in a patent database being for use with a set of target patents, each target patent related to the predefined subject matter, the method comprising: creating a feature space based on frequently occurring terms found in the set of target patents; creating a partition taxonomy based on a clustered configuration of the feature space; editing the partition taxonomy using domain expertise to produce an edited partition taxonomy; creating a classification taxonomy based on structured features present in the edited partition taxonomy; creating a contingency table by comparing the edited partition taxonomy and the classification taxonomy to provide entries in the contingency table; and identifying all significant relationships in the contingency table to help determine the presence of any white space.

5 Claims, 2 Drawing Sheets

U.S. PATENT DOCUMENTS

| | | | |
|---|---|---|---|
| 2006/0161534 A1* | 7/2006 | Carson et al. | 707/3 |
| 2006/0206462 A1* | 9/2006 | Barber | 707/3 |
| 2006/0224356 A1* | 10/2006 | Castelli et al. | 702/176 |
| 2007/0022096 A1* | 1/2007 | Hertz | 707/3 |
| 2007/0136264 A1* | 6/2007 | Tran | 707/4 |
| 2008/0215510 A1* | 9/2008 | Regli et al. | 706/12 |

OTHER PUBLICATIONS

Rasmussen, E. "Clustering algorithms," Information Retrieval: Data Structures and Algorithms; ed. Frakes, W. B. and Baeza-Yates, R., 1992; pp. 419-442; Prentice Hall, Englewood Cliffs, New Jersey.

* cited by examiner

METHODOLOGIES AND ANALYTICS TOOLS FOR IDENTIFYING WHITE SPACE OPPORTUNITIES IN A GIVEN INDUSTRY

BACKGROUND OF THE INVENTION

The present invention relates generally to the field of online analytic processing of data and, in particular, to patent and web-related analytics tools and methodologies for assisting in the identification of potential white space opportunities.

Modern business intelligence routinely makes extensive use of customer and transactional data obtained from databases stored in data warehouses. Such business intelligence may typically be obtained by posing an analytical search and/or query to one or more associated relational databases. Intellectual property (IP) intelligence, in particular, may be critical to the competitive advantage of a business entity. The business entity may seek to maximize the value of its IP by investigating and identifying areas of relevant patent "white space" in an industry, where white space is a term generally used to designate one or more technical fields in which little or no IP may exist.

In the current state of the art, however, the process of identifying white space can be time-consuming and ineffective. For example, conducting a search via the Internet may require multiple labor-intensive and time-consuming sessions. Moreover, the search results may require further manual processing to yield an output that may or may not be of value to the interested business entity.

As can be seen, there is a need for better methodologies and tools dedicated to the identification of potential white space opportunities.

SUMMARY OF THE INVENTION

In one embodiment of the present invention, a method is disclosed for use with at least one keyword retrieved from a first set of documents related to a predefined subject matter, the method comprising: constructing snippets from textual material in the first set of documents, each of the snippets including at least one word appearing within a specified text distance of the at least one keyword; defining a plurality of categories wherein each of the snippets is assigned to one of the categories, each of the categories designated for receiving similar snippets; creating a respective mathematical model for each of the categories; analyzing a second set of documents to determine an assignment for each of the documents in the second set of documents to one of the categories, the assignment based on matching the document in the second set of documents to the mathematical model for the assigned category; and identifying at least one white space in the second set of documents, the at least one white space including fewer than a specified number of documents.

Another embodiment of the present invention is a method for analyzing predefined subject matter in a patent database, the method being for use with a set of target patents, each of the target patents related to the predefined subject matter, the method comprising: creating a feature space based on frequently occurring terms found in the set of target patents; creating a partition taxonomy based on a clustered configuration of the feature space; editing the partition taxonomy using domain expertise to produce an edited partition taxonomy; creating a classification taxonomy based on structured features present in the edited partition taxonomy; creating a contingency table by comparing the edited partition taxonomy and the classification taxonomy to provide entries in the contingency table; and using the identification of significant relationships in the contingency table to determine the presence of a white space.

Yet another embodiment of the present invention is a method for conducting an analysis to provide patent information to a customer, the method being for use with a set of customer patents, each of the customer patents related to business needs of the customer, the method comprising: creating a first taxonomy for the set of customer patents, the first taxonomy related to technology underlying the customer patents; creating a second taxonomy for the set of customer patents, the second taxonomy related to an application of the technology; and creating a contingency table by comparing the first taxonomy to the second taxonomy, the contingency table providing an indication of one or more relationships of interest for the customer.

Yet another embodiment is a computer program storage device readable by machine that tangibly embodies a program of instructions executable by the machine to is perform a method comprising the steps of: assembling a set of target documents using one or more keywords, each of the target documents related to a predefined subject matter; analyzing each of the target documents to derive a count of occurrences of the keywords in each of the target documents; creating a first taxonomy for the set of target documents, the first taxonomy related to technology underlying the target documents; partitioning the set of target documents into a plurality of categories based on words or phrases appearing within a specified distance of one of the keywords; and accepting input for applying domain expertise to selectively delete, merge, and create categories.

Still another embodiment is a computer program product for use with at least one keyword retrieval from a set of initial documents related to a predefined subject matter, the program comprising a computer usable medium including a computer readable program, wherein when executed on a computer the computer readable program causes the computer to: construct snippets from textual material in the first set of documents, each of the snippets including at least one word appearing within a specified text distance of the keyword; define a plurality of categories wherein each snippet is assigned to one of the categories, each of the categories designated for receiving similar snippets; create a respective mathematical model for each category; analyze a second set of documents to determine an assignment for each document in the second set of documents to one of the categories, the assignment based on matching each of the documents in the second set of documents to the mathematical model for the assigned category; and identify at least one white space in the second set of documents, the white space including fewer than a specified number of documents.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

In general, elements of the present invention provide a method for analyzing predefined subject matter in a patent database in which the method functions to incorporate the inputs of one or more domain experts as the process executes. The process may include the use of keywords and searching through structured and unstructured fields to automatically create a feature space (with numeric vectors assigned to documentation), with the feature space being used to create taxonomies based on domain knowledge. Retrieved patents are classified, domain knowledge may be used to determine patent relevance, and a contingency table may be constructed to aid the domain expert to identify potential "white space" opportunities.

The present state of the art does not provide for the incorporation of domain knowledge into the process of developing a taxonomy; does not provide for invoking expert input before conducting an analysis; and generally conducts a simplistic search with little or no process insight. In contrast, the disclosed methods function to enable domain experts to both generate and refine taxonomies, to capture domain knowledge before conducting an analysis, and to uncover otherwise hidden associations among documents in identifying white space opportunities.

Figure 1:
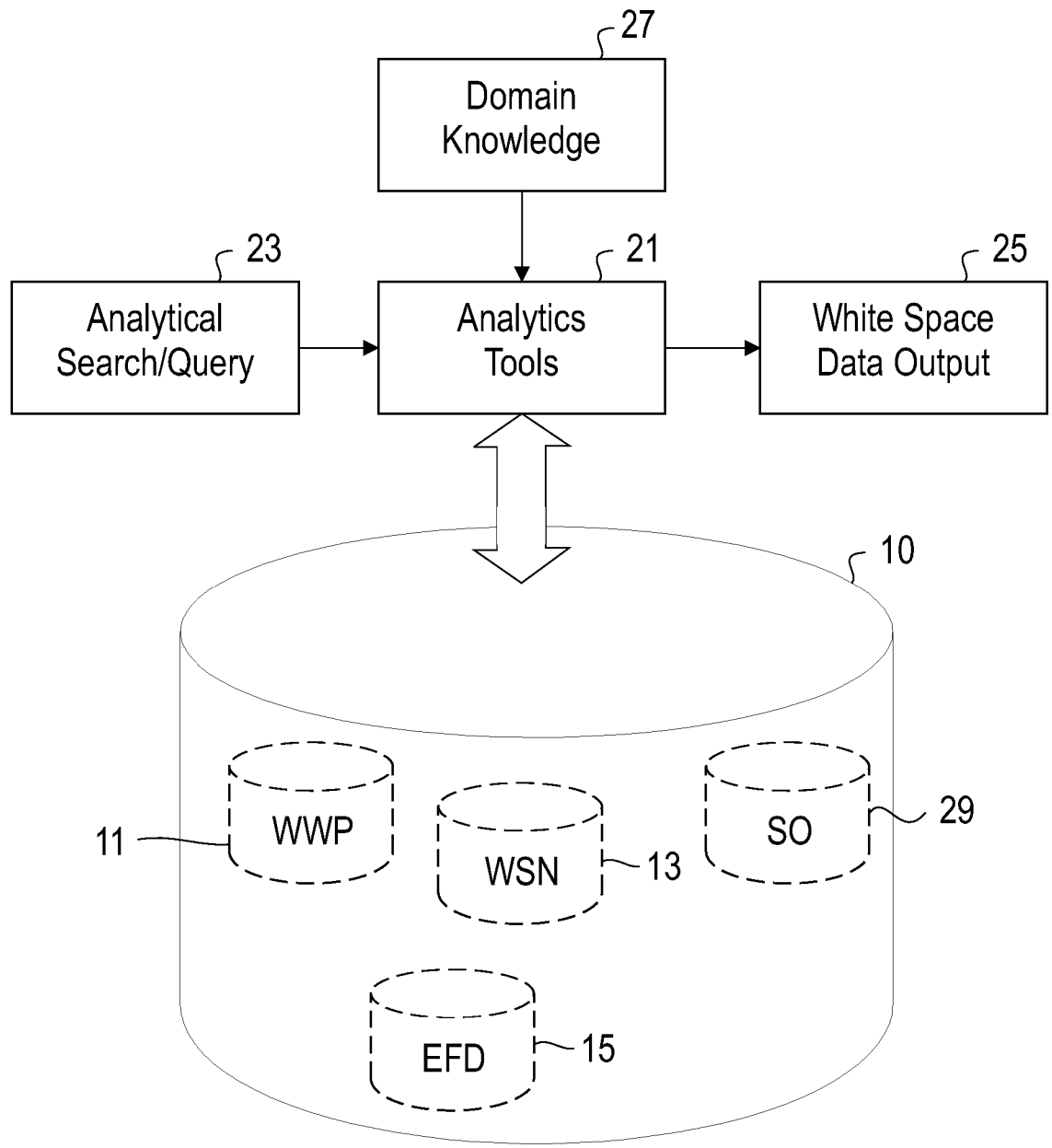
FIG. 1 is a diagrammatical representation of analytic tools used to access a data warehouse including a worldwide patent database; a web, scientific, and news database; and a financial database, in accordance with an embodiment of the present invention.

There is shown in FIG. 1 a data warehouse 10 which may comprise, in particular, databases useful in intellectual property analysis such as: a worldwide patent (WWP) database 11; a web, scientific, and news (WSN) database 13; and a financial (EFD) database 15 (e.g., Edgar financial data). The data warehouse 10 may also contain information about the documents comprising the worldwide patent database 11; the web, scientific, and news database 13; and the financial (FD) database 15. A set of analytics tools 21 may access the data warehouse 10 to perform a number of functions, including: extracting patents and related documents, automatically classifying patents, performing contingency analysis, and analyzing various relationships among patents and companies, as described in greater detail below.

An analytical search/query 23 may be placed to the data warehouse 10 by a database user interested in identifying potential white space opportunities in a particular industry, a task herein broadly denoted as a white space data output 25. As explained in greater detail below, a set of domain knowledge 27 provided by one or more domain experts may be applied to execute or enhance one or more of the functions performed by the analytics tools 21. For example, a process of analyzing relationships among patents and companies may invoke both the expertise of an individual skilled in the technology of document classification and the expertise of a domain expert skilled in the technology of the patents under analysis. Knowledge acquired as a result of the functions performed by the analytics tools 21 and by the domain experts may be written out to a string representation in the data warehouse 10 as a serialized object (SO) 29. Information in the serialized object 29 may be permanently saved and made available for sharing by other users.

Generally, the analytics tools 21 initiates an "investigate" phase in which the analytics tools 21 (i) may use a search tool to identify a set of companies in an industry of interest; (ii) may retrieve patents and other related materials, including web pages; (iii) may describe technology and products currently relevant to the industry of interest; and (iv) may convert selected web page text into numeric vectors corresponding to word, feature, and structured information content in the web page.

Subsequently, in a "comprehend" phase, the analytics tools 21 may use a document classification technology, or taxonomy generation technology, to classify the selected web page text into appropriate categories using a numeric vector space and a feature space created for the retrieved patents and other related materials. The document classification technology may use an interactive clustering of the feature space so as to assist a domain expert to refine the feature space if desired. This may be followed by an "examine" phase in which modeling and document classification technology may be used to: (i) classify patents based on web page categories; and (ii) determine which, if any, categories are not well represented in the set of retrieved patents for the industry of interest. Determination of these categories, which may represent potential white space opportunities, may comprise some of the information provided as the white space data output 25.

Figure 2:
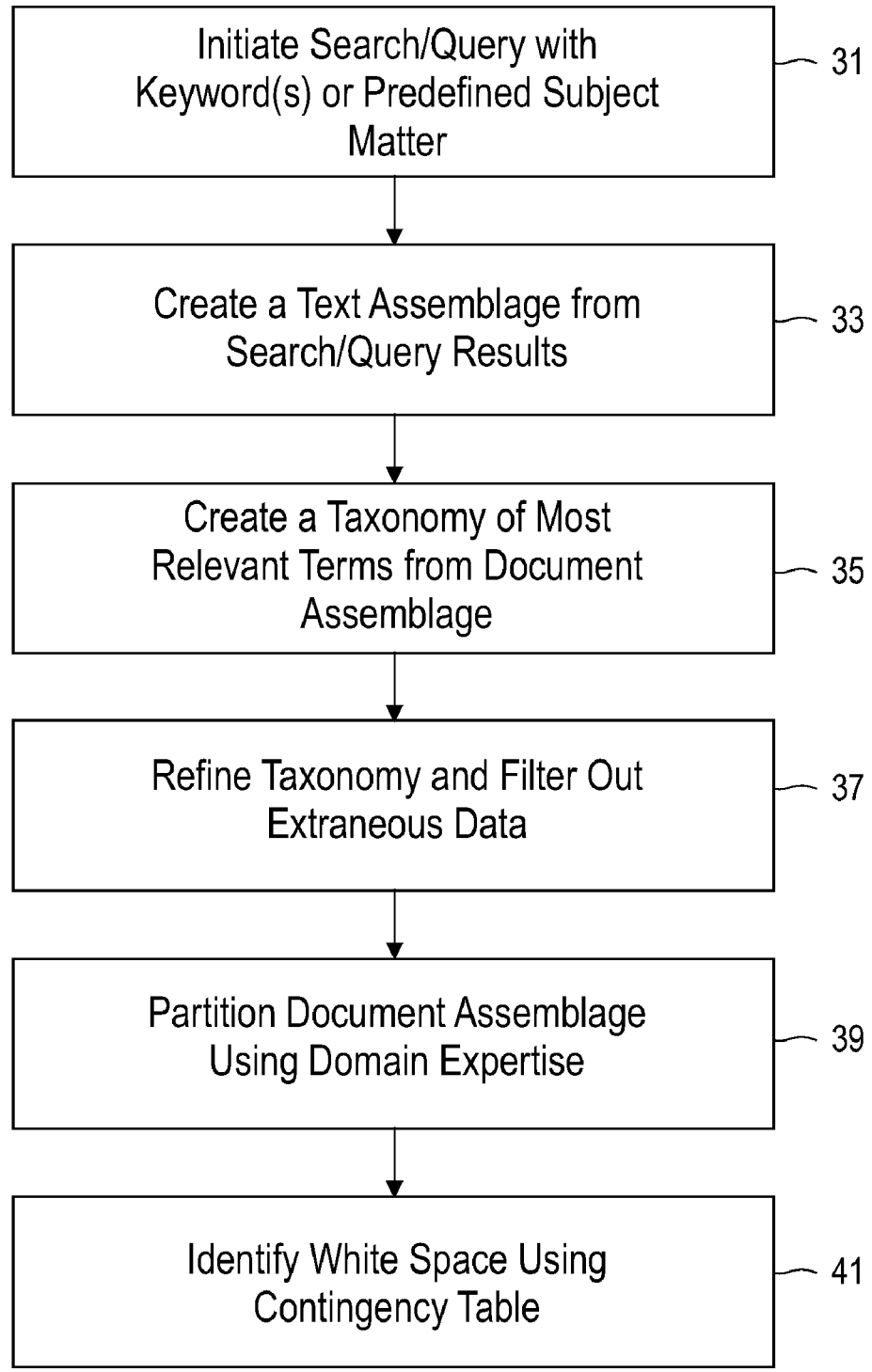
FIG. 2 is a flow diagram illustrating operation of the analytics tools of FIG. 1, in accordance with an embodiment of the present invention.

A general description of the method of the present invention can be provided with additional reference to a flow diagram 30, in FIG. 2. The search/query 23 may be initiated using one or more keywords and/or predefined subject matter, at step 31. As understood in the relevant art, a "search" may include entering selected words or text and retrieving documents matching the words or text by using an indexing feature. A "query" may include providing a field, a value, or a pattern and retrieving documents from the database warehouse 10 matching the provided field, value, and/or pattern. The search/query 23, which need not be a single operation, may be performed as a query, may be performed as a search, may be performed as a search and a query sequentially, or either or both of the search and query may be repeated as needed.

An initial assemblage of retrieved documents or text may be created from results of the search/query 23, at step 33. That is, a search may be executed, and a query may be performed using the results of the search to retrieve a collection of documents matching initial search criteria. For example, an industry may be selected, given one or more companies that are representative of that industry. One or more keywords may be used that describe the selected industry. Patents and other files, either assigned to the selected companies or related to the keywords, may be extracted from the database to form a first set, or collection ($P_0$), of extracted documents.

Second tier companies (i.e., other companies related to the given companies but not represented in the first set $P_0$) may be found by looking across structured features and unstructured features for common characteristics shared by the patents and the other files in the first document set $P_0$. Examples of structured features in a patent may include: name of inventor, name of assignee, classification of the patent, and documents referenced by the patent. Examples of unstructured features may include regular text, such as may be found in the abstract, the claim language, or in the title of the patent or document. An unstructured feature that may be converted into a structured feature is referred to herein as an "annotation." This conversion process may include, for example, recognizing a pattern, using a synonym from a dictionary, or equating the idea conveyed by text to a structured concept. For instance, reference to a chemical compound in a text discussion without using a standard chemical name or a chemical formula may be considered an unstructured feature or an annotation. This feature may be retrieved and considered to be a structured feature when the chemical compound is identified by its standard chemical name or chemical formula.

Patents and other files assigned to the second tier companies may be extracted from the database warehouse 10 to form a second set ($P_1$), of documents. Additional documents related to the second tier companies may be retrieved using the keywords and/or one or more web queries on an existing web store, and may be included in the second document set $P_1$. An assemblage of documents may be formed comprising the first document set $P_0$ and the second document set $P_1$ (i.e., $P_0+P_1$), referred to herein as a third document set ($P_2$).

A taxonomy $T_1$, may be generated from terms, or "snippets" most relevant to the third document set $P_2$, at step 35. ($T_1$ may also be generated from $P_0$ or $P_1$.) Snippets comprise portions of text surrounding one or more keywords of interest found in the patents and files of the third document set $P_2$. The snippets (e.g., words, phrases, structured features, annotations, and unstructured features), may comprise "features" in a specialized "dictionary" generated from the third document set $P_2$. For example, a snippet may include the name of a company of interest appearing in a web page, or may include a chemical compound or a technical term appearing in a patent.

Each document in the third document set $P_2$ may be assigned numeric vectors, where the numeric vectors are the occurrences, within each document, of different features or snippets. If the term "laser" appears in a particular patent ten times, for example, then the numeric vector for the feature "laser" may be assigned a value of ten for the patent. This process allows for the systematic and numerical description in a feature space of each document in the third document set $P_2$. In addition, different documents in the third document set $P_2$ may be automatically compared to determine how similar the documents are to one another.

Each snippet may be placed into a respective category in the taxonomy $T_1$. An uncategorized snippet may be placed into an existing category if an appropriate category exists, or into a new category if the appropriate category does not exist. Each of the categories in the taxonomy $T_1$ may be represented by a corresponding mathematical model, as explained in greater detail below.

Domain knowledge may be used to edit the taxonomy $T_1$ by using a domain expert to filter out noise (i.e., extraneous data) and to refine the set of terms comprising the taxonomy $T_1$, at step 37. The taxonomy $T_1$ can be edited, for example, by deleting a taxonomy category determined to be trivial; by merging two or more similar taxonomy categories into a single category, and/or by creating a new taxonomy category. Each of the documents in the third document set $P_2$ may thus be classified using the resulting categories created in the taxonomy $T_1$.

The third document set $P_2$ may be analyzed using the categories in the taxonomy $T_1$. For each category in the taxonomy $T_1$, domain expertise may be used to find the patents and files that best match the model for that category and determine if they are indeed related. This process effectively partitions the third document set $P_2$ such that each document (i.e., document or file) is assigned to a taxonomy category and each document appears in only one taxonomy category, at step 39.

In an exemplary embodiment, the process of partitioning the third document set $P_2$ may use a "k-means" procedure, where the parameter "k" refers to the number of categories produced from the third document set $P_2$. The parameter "k" maybe input to the analytics tools 21 by the domain expert, or it may be generated based on the size of the third document set $P_2$. The distance between a centroid of a category and a document numeric vector in the category may be expressed as a cosine distance metric $$d(X, Y) = -\frac{X \cdot Y}{\|X\| \cdot \|Y\|}$$

where X is the centroid vector and Y is the document numeric vector. The centroid is equivalent to the mean of the related category and may be found as part of the k-means partitioning process. A more detailed explanation of the generation of feature spaces and taxonomy generation may be obtained from commonly-assigned U.S. Pat. No. 6,424,971, "System and method for interactive classification and analysis of data."

In an exemplary embodiment, a two-dimensional matrix, denoted here as a "contingency table," may be used in the process of matching the taxonomy categories with the extracted patents and files. Match results may be summarized in tabular form from which potential white space opportunities in a particular industry may be identified, at step 41. This can be done, for example, by using domain expertise to analyze the matrix, to examine the match results, and to identify potential white space opportunities in categories having few or no related patents.

The above methodology and analytics tools may be described in greater detail by illustrating how the disclosed method can be used to find potential white space for a subject company, for example, IBM. The analytical search/query 23 may be initiated by using the name of a service provider in the information technology (IT) field. For purpose of the present illustration, a fictitious company, designated by the name "Acme IT," is used to represent the IT industry. It should be understood that the disclosed method can be practiced by using any company or set of companies in a related industry, or by using any set of keywords related to a given industry.

The analytical search/query 23 may be directed to web pages that reference "Acme IT," in a web page repository or similar database in the data warehouse 10. The analytical search/query 23 may produce a web page listing of "N" entries, represented by the partial list in Table 1.

TABLE 1

| | Web Pages Retrieved with "Acme IT" Search |
|---|---|
| 1 | The Salt Lake Tribune - Lights, Camera and Justice . . . |
| 2 | Herald.com - Your Miami Everything Guide . . . |
| 3 | The News-Press: Sports - Even if They Win . . . |
| 4 | Green Bay Press-Gazette - Lawyers Combine Suits . . . |
| 5 | IndyStar.com Message Boards - Pledge Case Ruling . . . |
| 6 | Business 2.0 - Archive of Past Issues . . . |
| 7 | NewsDay.com - Creating objects . . . |
| 8 | DallasNews.com - Make This Your . . . |
| . | . |
| . | . |
| . | . |
| N − 1 | Huckleberries Online: Duncan Case . . . |
| N | Internet Directory > Computers > Computer Science . . . |

The web page listings in Table 1 may be edited to extract snippets of word groupings that include the term "Acme IT." In the present example, the taxonomy $T_1$ may be based on such Acme IT snippets. The resulting taxonomy $T_1$ may then be edited to incorporate domain expertise and to produce "M" taxonomy categories, listed in Table 2:

TABLE 2

Taxonomy Based on Search Results

| Entry | Taxonomy Category | Size | Cohesion | Distinctness |
|---|---|---|---|---|
| 1 | Acme IT opens data center | 81 (0.91%) | 76.76% | 71.04% |
| 2 | Sing Tel to select Acme IT system | 59 (0.66%) | 71.63% | 32.63% |
| 3 | Acme IT Abstract | 359 (4.03%) | 59.56% | 30.60% |
| 4 | Risk management solutions | 212 (2.38%) | 55.08% | 27.87% |
| 5 | Securities industry news | 131 (1.47%) | 51.47% | 32.63% |
| 6 | Acme IT management services | 345 (3.87%) | 47.36% | 25.89% |
| 7 | Business continuity planning | 301 (3.38%) | 47.15% | 41.92% |
| 8 | Trading systems | 226 (2.54%) | 41.09% | 42.54% |
| . | . | . | . | . |
| . | . | . | . | . |
| . | . | . | . | . |
| M − 1 | Headlines | 223 (2.50%) | 36.90% | 40.85% |
| M | Miscellaneous | 2057 (23.09%) | 18.71% | 34.81% |

As used herein, the term "cohesion" may be defined as an indication of the similarity to one another of documents in a given taxonomy category. A cohesion value of 100%, for example, indicates that the documents in a taxonomy category all have the same word content. The term "distinctness" may be defined as the degree to which two taxonomy categories are different from one another. Each taxonomy category in Table 2 is represented by a category centroid, the centroid being the average of all feature vectors of the documents in the category. Distinctness between two taxonomy categories provides an indication of their difference. A distinctiveness value for two taxonomy categories may be obtained by determining the distance between category centroids, where the distance is taken between closest centroid neighbors in the feature space. A distinctiveness value of zero would indicate that the category centroids are coincident and that the respective taxonomy categories are thus not distinct from one another.

The taxonomy categories provided in Table 2 may be reviewed by a domain expert for the purpose of selecting only those categories that are relevant to technologies of interest in the IT industry. The categories selected as relevant may be used to create a Taxonomy Category Table, as exemplified by Table 3. Additionally, the domain expert may also make use of the distinctiveness values provided in Table 2 as guidelines in deciding whether to combine or delete certain taxonomy categories. For example, a taxonomy category having less than a predetermined distinctiveness value may be a good candidate for deletion and merging with another category.

TABLE 3

Relevant Taxonomy Categories

| Entry | Cluster Name | Size |
|---|---|---|
| 1 | Risk management solutions | 102 |
| 2 | Trading systems | 145 |
| 3 | Business integration | 66 |
| 4 | Business continuity planning | 119 |
| 5 | Asset management services | 49 |
| . | . | . |
| . | . | . |
| . | . | . |
| K | Data management services | 134 |
|  | Total | 1766 |

A classification model may be created from the taxonomy categories and corresponding snippets of word groupings. The domain expert, for example, may classify any extracted text into one of the K taxonomy categories. The features of the classification model may be based on the same features used to generate the taxonomy $T_1$. That is, the dictionary of frequently occurring features extracted from the web page snippets may be used to generate the classification model.

The resulting taxonomy $T_1$ may be applied to a set of IBM patents, for example, to determine the white space in the IBM portfolio where little or no relevant IP exists. It should be understood that the above method can readily be applied to another set of patents, such as a set of patents assigned to one or more IBM competitors in a given industry.

TABLE 4

IBM Patents in Relevant Taxonomy Categories

| Entry | Category Name | Size | Cohesion | Distinctness |
|---|---|---|---|---|
| 1 | Business integration | 2054 (7.93%) | 12.22% | 16.72% |
| 2 | Data/disaster recovery | 1557 (6.01%) | 8.82% | 18.26% |
| 3 | Data management services | 7125 (27.52%) | 7.88% | 12.48% |
| 4 | Asset management services | 3861 (14.91%) | 7.68% | 12.20% |
| 5 | Risk management solutions | 239 (0.92%) | 7.19% | 11.91% |
| . | . | . | . | . |
| . | . | . | . | . |
| . | . | . | . | . |
| K | Trading systems | 1011 (3.90%) | 5.47% | 20.60% |
|  | Total/Average | 25894 | 8.37% | 14.91% |

A domain expert may examine each of the K individual categories with respect to the number of patents contained in the individual category. An examined category containing a small number of patents unrelated to the technology identified with the examined category may be an indication of potential white space.

In the example of Table 4, it can be seen that IBM does not appear to have significant IP listed in the category named "Risk management." Moreover, the IBM IP listed in Table 4 appears to be mostly unrelated to the technical field of risk management. These factors present an indication of potential white space in IBM's portfolio which may be addressed by creation of additional risk management IP or by cross licensing with an appropriate assignee. Note also that the domain expert has edited the categories of the taxonomy $P_1$ by deleting the category of "Business continuity," and by adding the category of "Data/disaster recovery."

It can be appreciated by one skilled in the art that the invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood, of course, that the foregoing relates to exemplary embodiments of the invention and that modifications may be made without departing from the spirit and scope of the invention as set forth in the following claims.

What is claimed is:

1. A computer implemented method for identifying overlap among a plurality of documents related to a predefined subject matter that is contained in the plurality of documents, the plurality of documents stored on a computer, the method comprising:
performing a retrieval operation on a plurality of databases stored on a computer, the databases including at least one of the plurality of documents and information about the plurality of documents relevant to said subject matter, the retrieval operation selected from a group of operations consisting of a search operation, a query operation, a search operation followed by a query operation, and a query operation followed by a search operation,
wherein the search operation consists of entering as a utilized search term selected text and retrieving the plurality of documents matching the selected text through use of an indexing feature, and
wherein the query operation consists of entering, as a utilized search term, a selection from a group consisting of a field, a value, and a pattern, and retrieving documents matching the utilized search term;
identifying a first set of documents that are related to said at least one utilized search term;
constructing snippets from textual material in said first set of documents, each of said snippets including at least one word appearing within a specified text distance of said at least one utilized search term, wherein snippets are extracted text around a key word or phrase found in a patent;
assigning numeric vectors to each of the first set of documents, wherein the numeric vectors are occurrences within each of the first set of documents of one of the snippets;
defining a plurality of categories;
assigning each of said snippets to one of said categories, each of said categories designated for receiving similar snippets;
creating a respective mathematical model for each of said categories, each of said categories being represented by a centroid of features of said snippets in said category, wherein said centroid is an average of said features, and further wherein the features indicate a frequency of the at least one utilized search term within the snippets in said category;
determining a first measure of cohesion and a first measure of distinctiveness for each of said categories, wherein the first measure of cohesion indicates a level of similarity of the snippets within each of the categories, and further wherein said first measure of distinctiveness is determined as a distance between two closest centroid neighbors;
altering said categories, wherein those of said categories that have centroids closer to each other than a predetermined value are merged with one another;
deleting at least one of said categories in which the centroids of said categories are closer to each other than a predetermined value;
assigning each document in a second set of documents to one of said categories based on matching each of said second set of documents to said mathematical model of said categories;
determining a second measure of cohesion and a second measure of distinctness for each of said second set of documents with respect to a second set of categories, wherein the second measure of cohesion indicates a level of similarity of the second set of documents within the second set of categories, and further wherein said second set of categories is altered in view of said second set of documents;
identifying a potential white space opportunity in said second set of documents, including constructing a contingency table wherein white space specifies an area that shows low numbers of patents, said at least one white space having a second value of distinctiveness within the second measure of distinctiveness that is less than a second predetermined value of distinctiveness; and
providing said identification of white space to a user.

2. The method of claim 1, including:
assembling the first set of documents and the second set of documents to create a third set of documents.

3. The method of claim 2, including:
automatically comparing documents within the third document set for similarity to one another.

4. The method of claim 2, including:
extracting first structured features and unstructured features of the third set of documents, wherein the first structured features comprise author, assignee, and classification of each of the third set of documents, and documents referenced by each of the third set of documents.

5. The method of claim 4, including:
converting the extracted unstructured features of the third set of documents to second structured features of the third set of documents.

* * * * *